United States Patent
Staubach et al.

(10) Patent No.: US 11,506,124 B2
(45) Date of Patent: Nov. 22, 2022

(54) SUPERCRITICAL CO2 CYCLE FOR GAS TURBINE ENGINES HAVING SUPPLEMENTAL COOLING

(71) Applicant: United Technologies Corporation, Farmington, CT (US)

(72) Inventors: Joseph B. Staubach, Colchester, CT (US); Amanda J. L. Boucher, Boston, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 85 days.

(21) Appl. No.: 16/832,535

(22) Filed: Mar. 27, 2020

(65) Prior Publication Data
US 2021/0301720 A1    Sep. 30, 2021

(51) Int. Cl.
*F02C 7/141*    (2006.01)

(52) U.S. Cl.
CPC .......... *F02C 7/141* (2013.01); *F05D 2260/20* (2013.01)

(58) Field of Classification Search
CPC .... F02C 7/141; F02C 6/06; F02C 6/08; F02C 7/143; F02C 7/16; F02C 7/185; F01D 25/12; F05D 2260/20
See application file for complete search history.

(56) References Cited

U.S. PATENT DOCUMENTS

| | | | | |
|---|---|---|---|---|
| 5,272,870 A | * | 12/1993 | Grieb | F02C 7/185 60/267 |
| 5,390,505 A | * | 2/1995 | Smith | F28D 7/0066 62/90 |
| 5,626,019 A | * | 5/1997 | Shimizu | F28D 15/00 60/39.465 |
| 5,987,877 A | * | 11/1999 | Steiner | F02C 7/14 60/39.83 |
| 8,549,833 B2 | * | 10/2013 | Hyde | F02C 6/18 60/204 |
| 9,014,791 B2 | * | 4/2015 | Held | F02C 3/34 600/476 |
| 9,316,141 B2 | | 4/2016 | Pilavdzic | |
| 9,745,899 B2 | | 8/2017 | Wright et al. | |

(Continued)

FOREIGN PATENT DOCUMENTS

| CN | 104297072 A | 1/2015 |
|---|---|---|
| CN | 107178436 A | 9/2017 |

(Continued)

OTHER PUBLICATIONS

European Search Report for European Application No. 21165402.5, dated Aug. 16, 2021, 7 pages.

*Primary Examiner* — Craig Kim
(74) *Attorney, Agent, or Firm* — Cantor Colburn LLP

(57) ABSTRACT

Gas turbine engines are described. The gas turbine engines include a compressor section, a combustor section, a turbine section, and a nozzle, wherein the compressor section, the combustor section, the turbine section, and the nozzle define a core flow path that expels through the nozzle. A waste heat recovery system is operably connected to the gas turbine engine, the waste heat recovery system having a working fluid. An auxiliary cooling system is configured to provide cooling to a working fluid of the waste heat recovery system.

19 Claims, 8 Drawing Sheets

(56) References Cited

U.S. PATENT DOCUMENTS

| | | | | |
|---|---|---|---|---|
| 2010/0107651 A1* | 5/2010 | Hyde | ................ | F02C 6/00 |
| | | | | 60/39.23 |
| 2012/0009075 A1 | 1/2012 | Ravikumar et al. | | |
| 2012/0067055 A1* | 3/2012 | Held | ................ | F02C 1/06 |
| | | | | 60/772 |
| 2015/0330303 A1* | 11/2015 | Delgado, Jr. | ............ | F02C 3/22 |
| | | | | 60/785 |
| 2017/0356340 A1* | 12/2017 | Vaisman | ................ | F02C 1/007 |
| 2018/0334959 A1 | 11/2018 | Jagtap | | |
| 2019/0153953 A1* | 5/2019 | Niergarth | ................ | F02C 7/224 |
| 2019/0154310 A1 | 5/2019 | Kniffler et al. | | |
| 2019/0291877 A1* | 9/2019 | Schwarz | ............ | F25J 3/04254 |
| 2020/0032704 A1* | 1/2020 | Allam | ................ | F25J 1/0032 |

FOREIGN PATENT DOCUMENTS

| | | |
|---|---|---|
| FR | 3060723 A1 | 12/2019 |
| JP | 4428341 B2 | 3/2010 |
| RU | 2388982 C2 | 5/2010 |
| WO | 2014087008 A1 | 6/2014 |
| WO | 2018134720 A1 | 7/2018 |

\* cited by examiner

SUPERCRITICAL CO2 CYCLE FOR GAS TURBINE ENGINES HAVING SUPPLEMENTAL COOLING

TECHNICAL FIELD

The present disclosure relates generally to systems for recovering waste heat in gas turbine engines, and more specifically to work recovery systems that utilize a supercritical $CO_2$ cycle to recover work from excess heat and generate additional power for the aircraft.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some configurations, a fan is also connected to the shaft and is driven to rotate via rotation of the turbine.

The compression process of the gas turbine engine results in a rise in the temperature of the gas at the compressor exit due to increasing pressure and component inefficiencies. At certain elevated pressures, the compressed air may become hotter than desirable for the purposes of turbine cooling and it is desirable to cool the compressed air prior to being used as a cooling fluid within the gas turbine engine. The waste heat that is generated (extracted) from this cooled cooling air is imparted to the exhaust flow and expelled without providing additional work. Waste heat is a source of loss (inefficiency) in a thermodynamic cycle, and reduction of waste heat in an engine therefore increases the efficiency of the engine.

BRIEF SUMMARY

According to some embodiments, gas turbine engines are provided. The gas turbine engines include a compressor section, a combustor section, a turbine section, and a nozzle, wherein the compressor section, the combustor section, the turbine section, and the nozzle define a core flow path that expels through the nozzle. A waste heat recovery system is operably connected to the gas turbine engine, the waste heat recovery system having a working fluid. An auxiliary cooling system is configured to provide cooling to the working fluid of the waste heat recovery system.

In addition to one or more of the features described above, or as an alternative, further embodiments of the gas turbine engines may include that the auxiliary cooling system is configured to cool the working fluid of the waste heat recovery system using at least one of ice and chilled water.

In addition to one or more of the features described above, or as an alternative, further embodiments of the gas turbine engines may include that the auxiliary cooling system is configured to cool the working fluid of the waste heat recovery system using a cryogenic fuel.

In addition to one or more of the features described above, or as an alternative, further embodiments of the gas turbine engines may include that the auxiliary cooling system comprises an auxiliary cooling source and an auxiliary cooling heat exchanger.

In addition to one or more of the features described above, or as an alternative, further embodiments of the gas turbine engines may include that the auxiliary cooling system comprises a control valve configured to selectively direct at least a portion of the working fluid of the waste heat recovery system to the auxiliary cooling heat exchanger.

In addition to one or more of the features described above, or as an alternative, further embodiments of the gas turbine engines may include that the waste heat recovery system comprises a turbine, a recuperating heat exchanger, a heat rejection heat exchanger, a compressor, and a heat recovery heat exchanger.

In addition to one or more of the features described above, or as an alternative, further embodiments of the gas turbine engines may include that the auxiliary cooling system comprises an auxiliary cooling heat exchanger arranged between the heat rejection heat exchanger and the compressor.

In addition to one or more of the features described above, or as an alternative, further embodiments of the gas turbine engines may include that the auxiliary cooling system comprises an auxiliary cooling heat exchanger arranged between the recuperating heat exchanger and the heat rejection heat exchanger.

In addition to one or more of the features described above, or as an alternative, further embodiments of the gas turbine engines may include that the heat rejection heat exchanger is a three-fluid heat exchanger configured to receive the working fluid of the waste heat recovery system, a cooling fluid of the auxiliary cooling system, and an air cooling flow.

In addition to one or more of the features described above, or as an alternative, further embodiments of the gas turbine engines may include that the turbine of the waste heat recovery system is configured to generate work.

In addition to one or more of the features described above, or as an alternative, further embodiments of the gas turbine engines may include that the heat recovery heat exchanger is arranged in an exhaust of the nozzle.

In addition to one or more of the features described above, or as an alternative, further embodiments of the gas turbine engines may include that the auxiliary cooling system is configured to be selectively used when a temperature of the working fluid of the waste heat recovery system is 70° F. or greater.

In addition to one or more of the features described above, or as an alternative, further embodiments of the gas turbine engines may include that the auxiliary cooling system includes a cryogenic fuel tank, an expansion turbine, and at least one additional heat exchanger.

In addition to one or more of the features described above, or as an alternative, further embodiments of the gas turbine engines may include that the at least one additional heat exchanger is configured to enable thermal exchange between a cryogenic fuel and at least one of (i) onboard power electronics, (ii) air of an environmental control system, (iii) engine oil, and (iv) cooled cooling air of the gas turbine engine.

In addition to one or more of the features described above, or as an alternative, further embodiments of the gas turbine engines may include that the waste heat recovery system includes a blower operably connected to a cooling duct and configured to create a pressure drop across a heat rejection heat exchanger of the waste heat recovery system.

In addition to one or more of the features described above, or as an alternative, further embodiments of the gas turbine engines may include that the working fluid of the waste heat recovery system is supercritical $CO_2$ ($sCO_2$).

In addition to one or more of the features described above, or as an alternative, further embodiments of the gas turbine engines may include that the auxiliary cooling system is configured to be selectively used when a temperature of the working fluid of the waste heat recovery system is 70° F. or greater at a pressure of about 853 psi.

In addition to one or more of the features described above, or as an alternative, further embodiments of the gas turbine engines may include that the auxiliary cooling system is configured to be selectively used when a temperature of the working fluid of the waste heat recovery system is 88° F. or greater at a pressure of about 1,070 psi.

In addition to one or more of the features described above, or as an alternative, further embodiments of the gas turbine engines may include that the auxiliary cooling system is configured to be selectively used when a temperature of the working fluid of the waste heat recovery system is 20° F. or greater at a pressure of about 422 psi.

In addition to one or more of the features described above, or as an alternative, further embodiments of the gas turbine engines may include that the auxiliary cooling system is configured to be selectively used when a temperature of the working fluid of the waste heat recovery system is −58° F. or greater at a pressure of about 100 psi.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
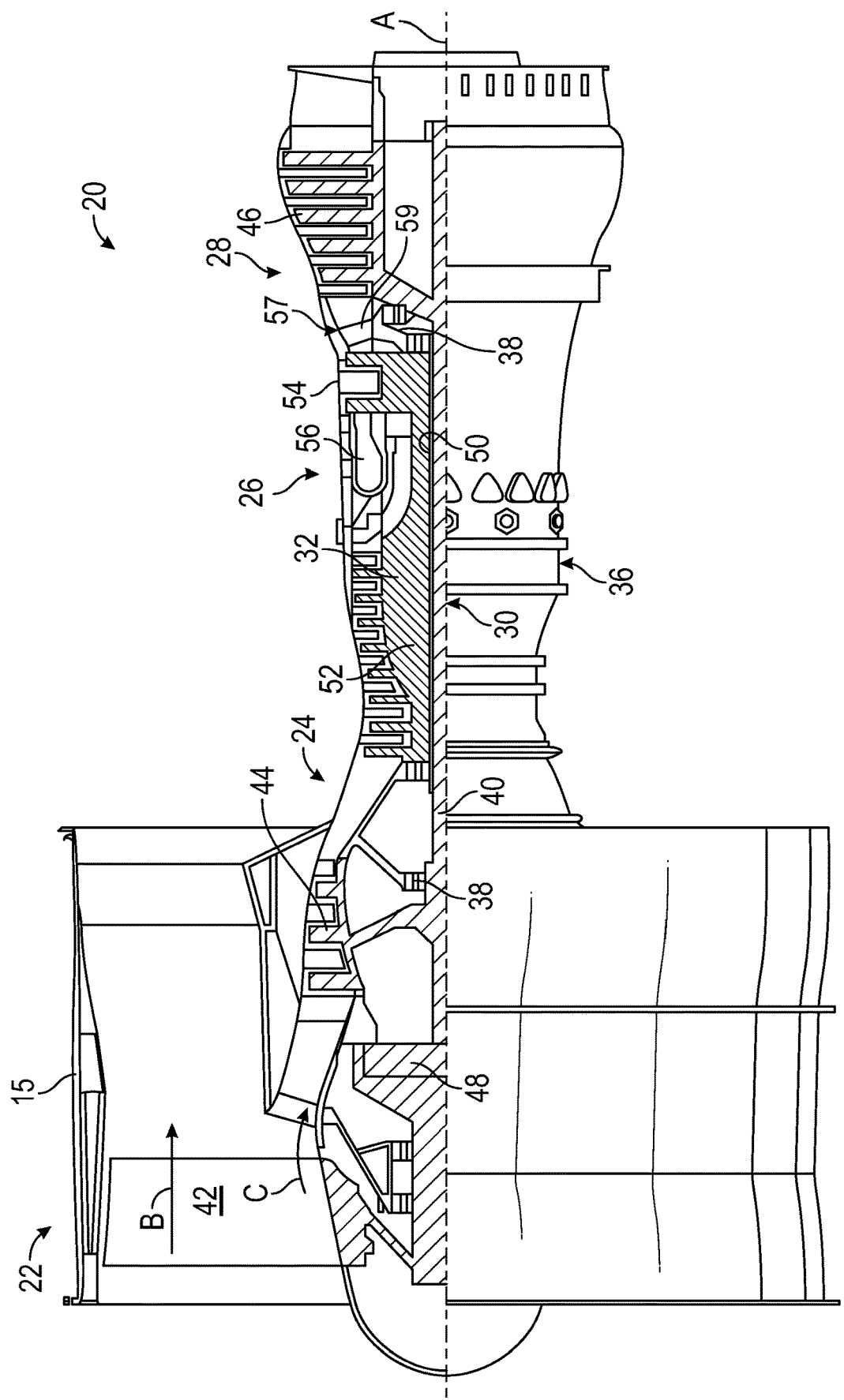
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined within a nacelle 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans or turboshafts.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy, and can be a large source of inefficiency in gas turbine engines.

Figure 2:
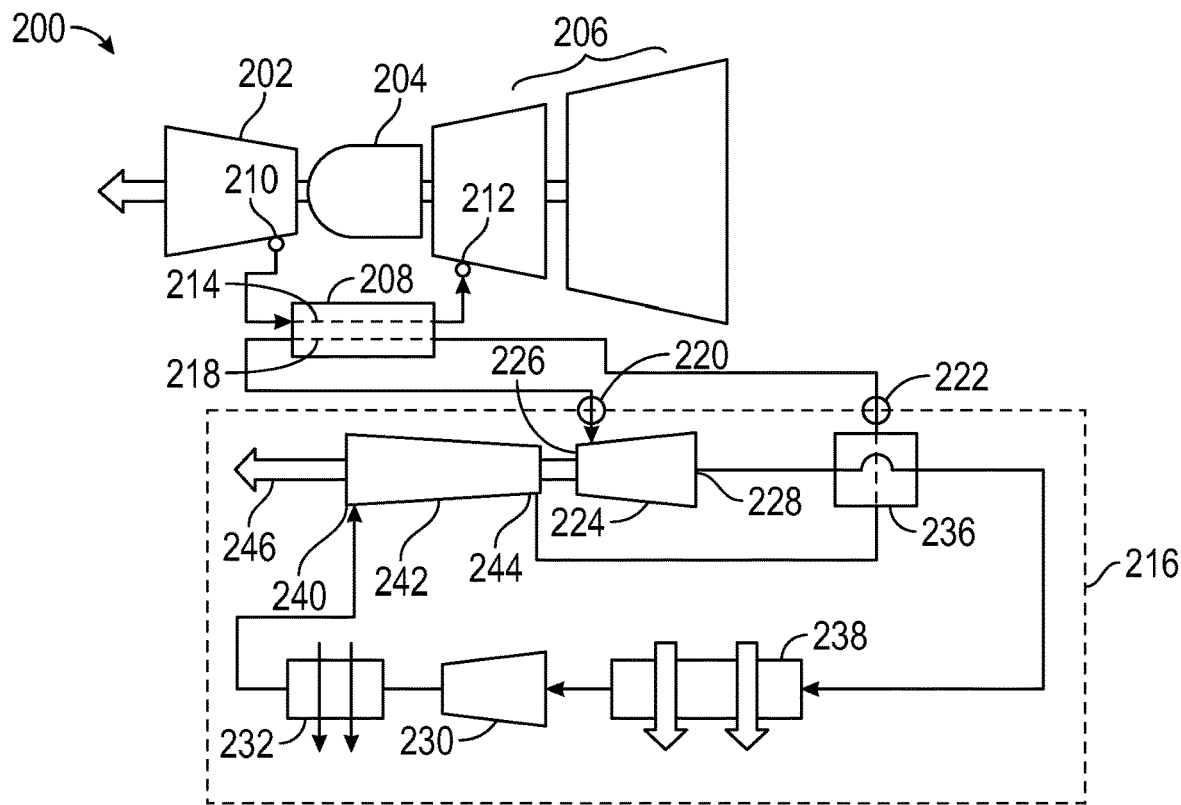
FIG. 2 is a schematic illustration of a gas turbine engine including a cooled cooling air driven overexpanding, recuperating supercritical $CO_2$ cycle that may incorporate embodiments of the present disclosure.

Turning now to FIG. 2, a schematic illustration of a gas turbine engine 200, including a compressor section 202, a combustor section 204, and a turbine section 206, all of which are connected via a primary fluid flow path, is shown. The gas turbine engine 200 may have, for example, a similar structure and configuration as that shown and described with respect to FIG. 1, although such structure is not to be limiting and such systems will include, at least, various additional components as described herein. The turbine cooling air is employed to provide cooling to the turbines and other components of the gas turbine engine 200.

To capture the waste heat within the gas turbine engine 200 and convert such waste heat to work, a waste heat recovery heat exchanger 208 is connected to a compressor bleed port 210 and a turbine inlet 212. The waste heat recovery heat exchanger 208 provides a hot flow path 214 that connects the compressor bleed port 210 to the turbine inlet 212. As such, the hot flow path 214 bypasses the combustor section 204. In one non-limiting example, the compressor bleed port 210 is located at or downstream of an aft most compressor stage of the compressor section 202. Further, in some embodiments, the turbine inlet 212 is arranged at or upstream of the upstream-most turbine stage of the turbine section 206.

As the air from the compressor bleed port 210 is passed through the waste heat recovery heat exchanger 208, a portion of the heat in the bypassed air may be extracted at the waste heat recovery heat exchanger 208. The heat extracted from the hot flow path 214 provides the air at the turbine inlet 212 to be at an appropriate pressure and temperature to be used to cool portions of the turbine section 206. The waste heat recovery heat exchanger 208 extracts heat from the air bled from the compressor section 202 and provides the extracted heat to a waste heat recovery system 216. The waste heat recovery system 216 is configured to use the waste heat to generate work and provide the generated work to one or more engine systems within the gas turbine engine 200. The waste heat recovery heat exchanger 208 includes the hot flow path 214 (may be a first fluid path) that connects the compressor bleed port 210 to the turbine inlet 212, and a cold flow path 218 (may be a second fluid path) that connects an inlet 220 of the waste heat recovery system 216 and an outlet 222 of the waste heat recovery system 216.

The waste heat recovery heat exchanger 208 is configured to transfer heat from air within the hot flow path 214 to working fluid in the cold flow path 218. The cold flow path 218 is connected to the waste heat recovery system 216. In some embodiments, the waste heat recovery system 216 is configured as a supercritical $CO_2$ ($sCO_2$) Brayton cycle. The waste heat recovery system 216 converts the extracted heat into work (e.g., rotational work and/or electrical) which is provided to at least one additional engine system of the gas turbine engine 200. The waste heat recovery system 216 includes a working fluid (e.g., $sCO_2$) that is retained and used within a closed-loop system (e.g., within the waste heat recovery system 216). The waste heat recovery system 216 recuperates waste heat and expands the $sCO_2$ working fluid below the supercritical pressure during a working cycle. Such expansion of the $sCO_2$ is referred to as an overexpanded recuperating work recovery cycle.

In the illustrative configuration, included within the waste heat recovery system 216 is a turbine 224 with an inlet 226 connected to an output of the waste heat recovery heat exchanger 208. The turbine 224 is configured to expand the heated working fluid and expels the heated working fluid through a turbine outlet 228. The turbine 224 may be configured to expand the working fluid beyond an expansion that would place the working fluid back at, or just above, the supercritical point prior to a beginning of a working fluid cycle. This expansion may be referred to as overexpansion. As a result of the overexpansion, a secondary compressor 230 and a second heat rejection heat exchanger 232 are, optionally, included within the working cycle of the waste heat recovery system 216 to return the working fluid ($sCO_2$) to a pressure and temperature required to achieve a supercritical state at the beginning of a working cycle.

From the turbine 224, the expelled working fluid is passed through a relatively hot passage of a recuperating heat exchanger 236. The working fluid is then passed to a relatively hot passage of a first heat rejection heat exchanger 238. After passing through the first heat rejection heat exchanger 238, the working fluid is passed to the secondary compressor 230 and the second heat rejection heat exchanger 232. The working fluid is then passed to an inlet 240 of a compressor 242 (alternately referred to as a working fluid compressor 242). The compressor 242 is configured to compress the working fluid and direct the compressed working fluid from a compressor outlet 244 to a cold passage of the recuperating heat exchanger 236. In practical terms, the location of the inlet 240 of the working fluid compressor 242 is referred to as the start of the working fluid cycle.

During operation of the waste heat recovery system 216, the compressor 242 compresses the working fluid, and passes the compressed working fluid through the recuperating heat exchanger 236 and the waste heat recovery heat exchanger 208, causing the compressed working fluid to be heated. The heated working fluid is provided to the inlet 226 of the turbine 224 and expanded through the turbine 224, driving the turbine 224 to rotate. As described above, the turbine 224 is configured to overexpand the working fluid beyond a point that would return the working fluid to the state of the working fluid at the beginning of the cycle. The rotation of the turbine 224 drives rotation of the compressor 242, the overexpansion compressor 230, and an output shaft 246. The output shaft 246 is mechanically connected or coupled to one or more additional turbine engine systems. The coupling of the output shaft 246 provides work to the connected systems using any conventional means for transmitting rotational work. Additionally, in some embodiments and configurations, the rotational work can be converted into electricity and used to power one or more engine or aircraft systems. By way of example, transmitting rotational work can include a drive shaft, a gear system, an electrical generator and distribution system, or any similar structure(s). In the illustrated example, the working fluid is a $CO_2$ fluid that is maintained at or above a supercritical point throughout the entirety of the working cycle. Due to being maintained at or above the supercritical point, the waste heat recovery system 216 may be referred to as a supercritical $CO_2$ cycle ($sCO_2$ cycle).

Figure 3:
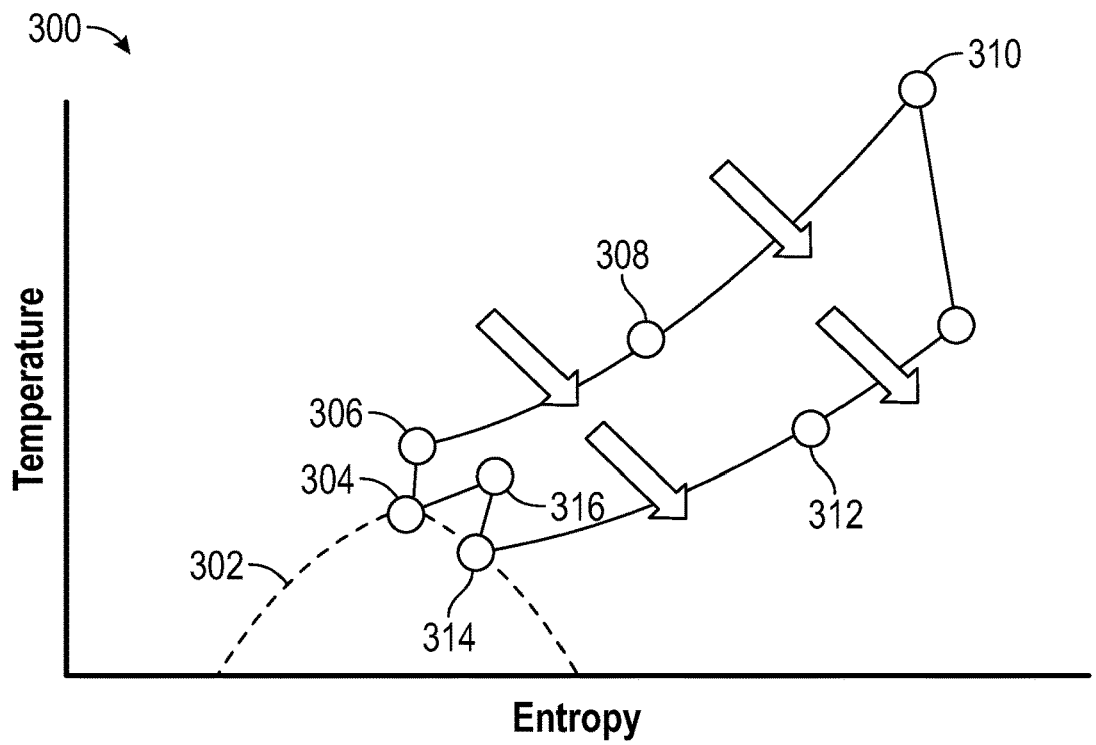
FIG. 3 illustrates a recuperating supercritical $CO_2$ cycle diagram.

Referring now to FIG. 3, a chart 300 illustratively shows a state of a working fluid throughout a working cycle of a waste heat recovery system in accordance with an embodiment of the present disclosure. For example, chart 300 may represent a state plot of a working fluid within the waste heat recovery system 216 shown in FIG. 2. The chart 300 illustrates the relationship of temperature with respect to entropy of the working fluid. Initially, the working fluid starts at or above a peak of a vapor dome 302 at a starting point 304. The vapor dome 302 represents an upper boundary above which the working fluid is at the corresponding supercritical point. Reference will be made, for explanatory purposes, with respect to the waste heat recovery system 216 shown in FIG. 2. For example, the starting point 304 is the state of the working fluid at, for example, the inlet of the compressor 242, prior to the working fluid undergoing compression by the compressor 242.

As noted, the working fluid is compressed in the compressor 242, causing the temperature and pressure of the working fluid to increase, while also imparting a minimal increase in the entropy of the working fluid until the working fluid is expelled from the compressor 242. Point 306 of the chart 300 represents the state of the working fluid at the compressor outlet 244. After exiting the compressor 242, the working fluid is passed through the recuperating heat exchanger 236, where the temperature and entropy of the working fluid are increased to point 308, at an outlet of the recuperating heat exchanger 236.

The working fluid is then passed from the outlet of the recuperating heat exchanger 236 to the waste heat recovery heat exchanger 208. Within the waste heat recovery heat exchanger 208, the entropy and temperature of the working fluid are increased to a point 310 on chart 300. The point 310 represents the state of the working fluid at the outlet of the waste heat recovery heat exchanger 208 and at the inlet 226 of the turbine 228. Further, the point 310 represents the peak temperature and entropy of the working fluid in the cycle.

As power is extracted from the working fluid in the turbine 224, the temperature and pressure of the working fluid will drop. The pressure is reduced below the level of the start of the cycle (point 304) and needs to be compressed back up to the pressure at the starting point 304. The overexpansion in the turbine 224 allows for additional work extraction compared to expanding to the pressure of the start of the cycle (point 304). After work has been extracted by the turbine 224, the overexpanded working fluid is provided to the recuperating heat exchanger 236 and a portion of the excess heat is transferred from the expanded working fluid to working fluid between points 306 and 308 of the chart 300 (representative of the cycle). The state of the working fluid at the outlet of the recuperating heat exchanger 236 and the inlet of the first heat rejection heat exchanger 238 is illustrated at point 312.

To improve operations of the waste heat recovery system 216, the waste heat recovery system 216 employs the second heat rejection heat exchanger 232 to return the state of the working fluid to as close to the starting point 304 as possible. Due to the overexpansion at the turbine 224, the pressure of the working fluid at an outlet of the heat rejection heat exchanger 238 (point 314) is lower than required to maintain the working fluid at a supercritical point at the start of the working fluid cycle. To address this, the working fluid is pressurized in the secondary compressor 230. The pressurization results in a pressure and temperature of the working fluid at an outlet (point 316) of the secondary compressor 230 being above that which is required to maintain the supercritical state of the working fluid. The second heat rejection heat exchanger 232 is used to transfer waste heat in a similar manner as the first heat rejection heat exchanger 238, and returns the working fluid to the inlet 240 of the working fluid compressor 242. The waste heat can be transferred into any number of heat sinks within the gas turbine engine including, but not limited to, fan duct air, ram air, fuel, and a transcritical $CO_2$ refrigeration cycle. The multiple stages of compression, with heat rejection in between, creates an intercooled compression that increases the bottoming cycle efficiency.

In the illustrated example presented in chart 300 of FIG. 3, the starting point 304 of the cycle is immediately at the vapor dome 302. In practical examples, the starting point can be targeted at slightly above the vapor dome in order to prevent minor variations during operation and other practical considerations from causing the working fluid to fall below the vapor dome 302.

In certain situations and/or configurations heat exchanger pressure losses and size may be concerns, especially with respect to the first and/or second heat rejection heat exchangers 232, 238 shown in FIG. 2. In some configurations of the waste heat recovery systems described above (e.g., a supercritical $CO_2$ bottoming cycle concept), if the waste heat is transferred into a fan duct or ram air via a heat rejection heat exchanger to return the working fluid to its starting point temperature, then there is a limited pressure drop available for the cold side of the heat exchanger (e.g., second heat rejection heat exchanger 232 shown in FIG. 2). A higher pressure drop would allow for a more compact, lighter weight second heat exchanger. Also, in a low fan pressure ratio stream, air will not naturally enter the second heat exchanger without extensive baffling, which can incur additional pressure losses and weight.

It will be appreciated that the configuration of the above described embodiments is merely for example and explanatory purposes, and other configurations are possible without departing from the scope of the present disclosure. For example, in some configurations, the secondary compressor and/or the second heat rejection heat exchanger, described with respect to FIG. 2, may be optional components in the system (e.g., may be removed or not necessary in certain configurations). The cooler exchanger, in some embodiments, may be arranged within a bypass flow stream that is not part of the hot section of a gas turbine engine. For example, in some embodiments, the cooler exchanger may be arranged within or along the bypass flow path B in a bypass duct, such as shown in FIG. 1. In other embodiments, the cooler heat exchanger may be arranged within an inlet scoop, such as on a turboshaft engine configuration.

It will be appreciated that the different heat exchangers of the systems described herein may have different functions and/or heat exchangers. For example, in some embodiments, the waste heat recovery heat exchanger may be a working fluid-to-air heat exchanger, the recuperating heat exchanger may be a working fluid-to-working fluid heat exchanger, and the heat rejection heat exchanger (e.g., heat rejection heat exchanger 238) may be a working fluid-to-exhaust heat exchanger. In some such embodiments, the heat rejection heat exchanger may be referred to as a waste heat recovery heat exchanger, and may be arranged proximate or near a core nozzle (e.g., downstream from a low pressure turbine of a gas turbine engine).

Figure 4:
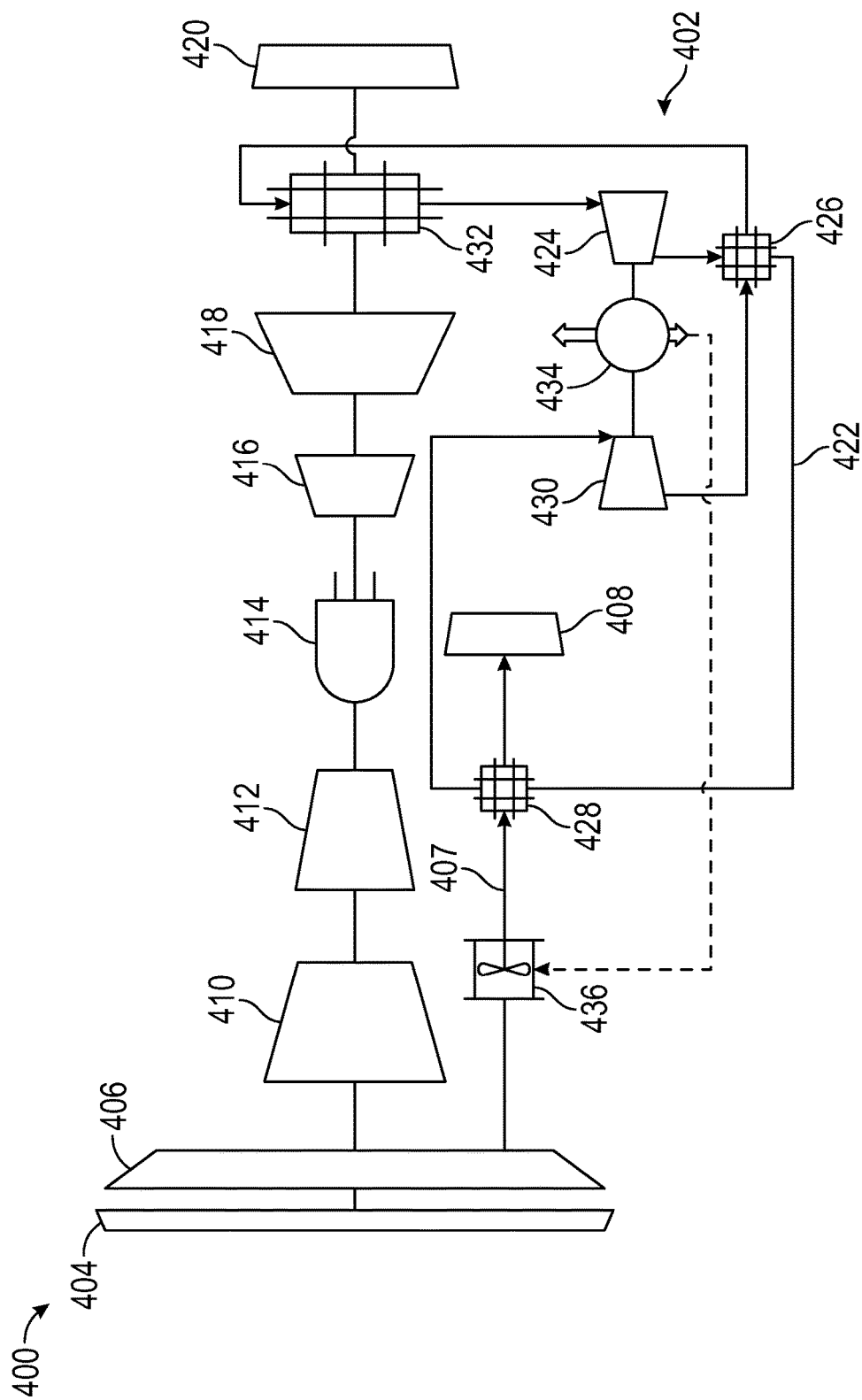
FIG. 4 is a schematic diagram of a gas turbine engine in accordance with an embodiment of the present disclosure.

Turning now to FIG. 4, a schematic diagram of a gas turbine engine 400 in accordance with an embodiment of the present disclosure is shown. The gas turbine engine 400 may be similar to that shown and described above, and may include a waste heat recovery system 402. The gas turbine engine 400 includes an inlet 404, a fan 406 with a fan nozzle 408, a low pressure compressor 410, a high pressure compressor 412, a combustor 414, a high pressure turbine 416, a low pressure turbine 418, and a core nozzle 420 or nozzle section. A bypass flow path may be defined within a bypass duct defined within a nacelle, as described above.

In this configuration, the waste heat recovery system 402 includes a working fluid flow path 422 that may be a closed-loop system of $CO_2$ that is cycled to extract additional work from waste heat of the gas turbine engine 400, such as described above. The waste heat recovery system 402 includes (in a flow path/cycle direction along the flow path 422) a turbine 424, a recuperating heat exchanger 426, a heat rejection heat exchanger 428, a compressor 430, and a heat recovery heat exchanger 432. The turbine 424 is coupled to a power output 434 (e.g., a drive shaft) that can output work. For example, the power output 434 may be connected to a generator (e.g., to generate electricity) or mechanically connected to a fan to drive rotation of the fan (e.g., mechanical work). In some embodiments, the heat recovery heat exchanger 432 is a full annular or circumferential heat exchanger that is arranged between the low pressure turbine 418 and the core nozzle 420, and thus provides a thermal exchanger between a working fluid within the flow path 422 and an exhaust of the gas turbine engine 400. The full annular circumferential heat exchanger may be a circular structure arranged about or within a nozzle of the gas turbine engine, as will be appreciated by those of skill in the art. In other embodiments, the heat recovery heat exchanger 432 may be less than a full annular or circumferential heat exchanger, with one or more sections of heat exchanger disposed at various locations at the outlet of the gas turbine engine 400. The heat recovery heat exchanger 432 is configured to provide a thermal exchange between a working fluid within the flow path 422 and an exhaust of the gas turbine engine 400.

The configuration of the gas turbine engine 400, and the waste heat recovery system 402 thereof, modifies the supercritical $CO_2$ bottoming cycle concept.

In some supercritical $CO_2$ bottoming cycle concepts, the heat or thermal energy of the working fluid may be transferred into a fan duct or ram air (e.g., cooling duct 407) via the heat rejection heat exchanger 428 to return the working fluid to the starting point temperature. The cooling duct is an airflow path through the gas turbine engine that is separate from a core flow path, and in some embodiments may be completely separate or may be a portion of air extracted from the core flow path. In some such embodiments, (e.g., fan duct location) there may be a limited pressure drop available for the cold side of the heat rejection heat exchanger to provide efficient temperature control of the working fluid (e.g., $CO_2$). In accordance with embodiments of the present disclosure, a higher pressure drop is generated at the heat rejection heat exchanger 428. Such increased pressure drop can allow for a more compact, lighter weight heat rejection heat exchanger. Also, in a low fan pressure ratio stream, air will not naturally enter the heat rejection heat exchanger without extensive baffling, which incurs additional pressure loss and/or volume/weight, and embodiments described herein can avoid such baffling within the heat rejection heat exchanger.

In the embodiment of FIG. 4, the heat rejection heat exchanger 428 is arranged within or along a cooling duct 407 defined between the fan 406 and the fan nozzle 408 (e.g., a fan duct). To increase a pressure drop across the heat rejection heat exchanger 428 (on the cold side), an optional blower 436 is arranged upstream of the heat rejection heat exchanger 428. The optional blower 436 may be a fan, turbine, blower, or other air-mover that can generate a pressure drop across the heat rejection heat exchanger 428. The optional blower 436 may be electrically, mechanically, or electromechanically driven. In one non-limiting embodiments, and as shown in FIG. 4, the optional blower 436 may be operably coupled to the power output 434. In one such example, the power output may be an electrical connection, with an electrical generator driven by a rotated shaft driven by the turbine 424. In other embodiments, the power output 434 may be a rotationally driven shaft that drives rotation and operation of the optional blower 436.

Adding a waste heat recovery system, such as a supercritical $CO_2$ bottoming cycle, to the main engine cycle can improve overall system efficiency and reduce fuel burn. However, for hot day take-off conditions, ambient conditions may decrease the efficiency of the system due to difficulty in bringing the $scCO_2$ back to appropriate (e.g., cold) operating conditions. There may also be a fuel burn benefit to the system as a whole, if the combined main engine cycle and $CO_2$ sub-system cycle can be designed for cruise conditions.

Figure 5:
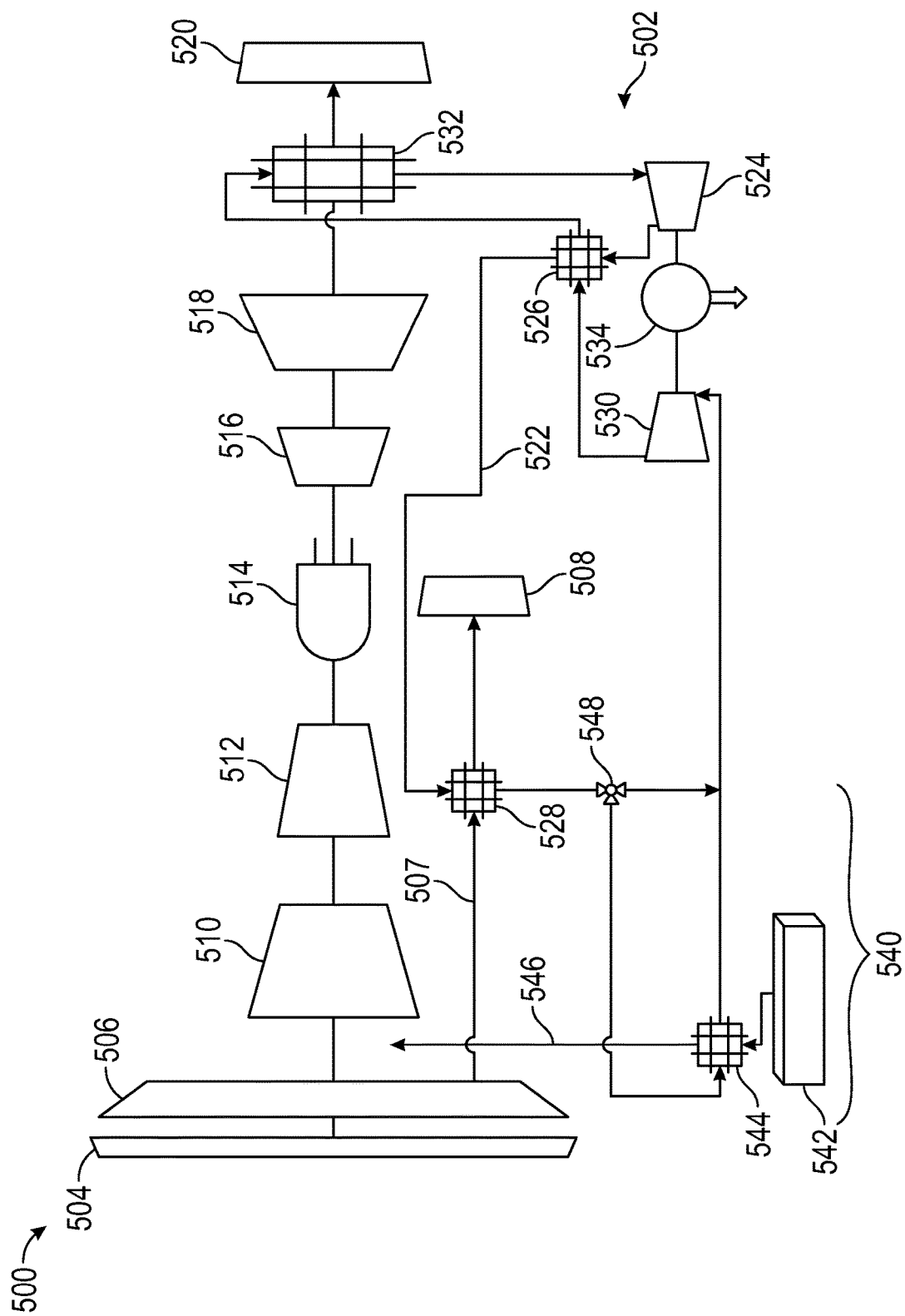
FIG. 5 is a schematic diagram of a gas turbine engine in accordance with an embodiment of the present disclosure.

Turning now to FIG. 5, a schematic diagram of a gas turbine engine 500 in accordance with an embodiment of the present disclosure is shown. The gas turbine engine 500 may be similar to that shown and described above, and may include a waste heat recovery system 502. The gas turbine engine 500 includes an inlet 504, a fan 506 with a fan nozzle 508, a low pressure compressor 510, a high pressure compressor 512, a combustor 514, a high pressure turbine 516, a low pressure turbine 518, and a core nozzle 520. A bypass flow path may be defined within a bypass duct defined within a nacelle, as described above.

In this configuration, the waste heat recovery system 502 includes a working fluid flow path 522 that may be a closed-loop system of $CO_2$ that is cycled to extract additional work from waste heat of the gas turbine engine 500, such as described above. The waste heat recovery system 502 includes (in a flow path/cycle direction along the flow path 522) a turbine 524, a recuperating heat exchanger 526, a heat rejection heat exchanger 528, a compressor 530, and a heat recovery heat exchanger 532. The turbine 524 is coupled to a power output 534 (e.g., a drive shaft) that can output work. For example, the power output 534 may be connected to a generator (e.g., to generate electricity) or mechanically connected to a fan to drive rotation of the fan (e.g., mechanical work).

In the waste heat recovery system 502 of FIG. 5, the heat or thermal energy of the working fluid may be transferred into a fan duct or ram air (e.g., a cooling duct 507) via the heat rejection heat exchanger 528 to return the working fluid to the starting point temperature. The cooling duct 507 is an airflow path through the gas turbine engine that is separate from a core flow path, and in some embodiments may be completely separate.

In this embodiment, the waste heat recovery system 502 further includes an auxiliary cooling system 540 that is operably connected to the waste heat recovery system 502. The auxiliary cooling system 540 includes an auxiliary cooling source 542 and an auxiliary cooling heat exchanger 544. The auxiliary cooling heat exchanger 544 is arranged along a branch of the flow path 522 to enable the working fluid within the flow path 522 to thermally interact with a fluid sourced from the auxiliary cooling source 542. As shown, the auxiliary cooling heat exchanger 544 is arranged downstream of the heat rejection heat exchanger 528 and upstream of the compressor 530 along the flow path 522. That is, the auxiliary cooling system 540 can provide additional or supplemental cooling to increase the cooling effectiveness that is achieved in combination with the heat rejection heat exchanger 528.

In some embodiments, the auxiliary cooling source 542 may be cool or cold water that is passed through the auxiliary cooling heat exchanger 544 and subsequently water or water vapor may be passed through an auxiliary cooling source flow path 546. In accordance with some configurations, the water or water vapor flowing through the auxiliary cooling source flow path 546 may be expelled overboard, injected into the main engine flow path (e.g., upstream of the low pressure compressor 510), or recaptured for reuse. If the water is injected into the main engine flow path, such injection of water may increase massflow during take-off. In some embodiments, the water can be recaptured and stored to be re-frozen at altitude, or to be used for aircraft/passenger in-flight use.

In accordance with some embodiments, the auxiliary cooling source 542 may be a stored water source, which may be ice, an ice-water mixture, or chilled water (e.g., a cooling fluid). In some embodiments, the cooling fluid may be passed through the cold side of the auxiliary cooling heat exchanger 544 during take-off conditions or other ground-based or relatively warm conditions.

As shown in FIG. 5, the auxiliary cooling system 540 includes a control valve 548. The control valve 548 provides for a split within the flow path 522 to allow for selective control of a flow path of the working fluid within the waste heat recovery system 502. The control valve 548 may be configured to direct all or some of the working fluid to the auxiliary cooling heat exchanger 544 prior to being directed to the compressor 530 of the waste heat recovery system 502. As such, the working fluid may be cooled to a desired temperature for efficient operation of the waste heat recovery system 502. For example, the control valve 548 may be operated to direct some or all of the working fluid to the auxiliary cooling heat exchanger 544 when an aircraft is on the ground and/or during takeoff. Once at altitude or cruise (or a designated altitude), the control valve may be actuated to direct all or most of the working fluid directly to the compressor 530, and bypass the auxiliary cooling system 540. That is, the additional cooling provided by the auxiliary cooling system 540 may not be needed at the ambient temperatures when at altitude.

In some embodiments, the control valve 548 may be operated to direct at least a portion of the working fluid into the auxiliary cooling system 540 when one or more predetermined or critical values is reached. That is, to ensure efficient operation of the waste heat recovery system 502, the working fluid may be diverted into and through the auxiliary cooling system 540 to ensure that efficient operation of the system is maintained. This may be necessary, particularly, when the temperature of the operating fluid increases. As such, reduction in the temperature of the working fluid may be necessary through operation of the auxiliary cooling system 540.

For example, when the temperature of the working fluid at the control valve 548 is about 88° F. at a pressure of about 1,070 psi, the control valve 548 may be operated to direct some or all of the working fluid into and/or through the auxiliary cooling system 540. Other example temperature/pressure conditions may be, without limitation, about 70° F. at a pressure of about 853 psi, about 20° F. at a pressure of about 422 psi, and about −58° F. at a pressure of about 100 psi. In some configurations, the auxiliary cooling system 540 may configured to be selectively used when a temperature of the working fluid of the waste heat recovery system is 70° F. or greater, to ensure that the temperature is reduced below 70° F. to maintain efficiency and operation of the waste heat recovery system 502 (e.g., below a critical temperature where efficiency may be impacted). In each of the above described examples, the control valve 548 is configured to operate and direct the working fluid into or through the auxiliary cooling system 540 to ensure efficient operation of the waste heat recovery system 502 (and work/power generated thereby).

Figure 6:
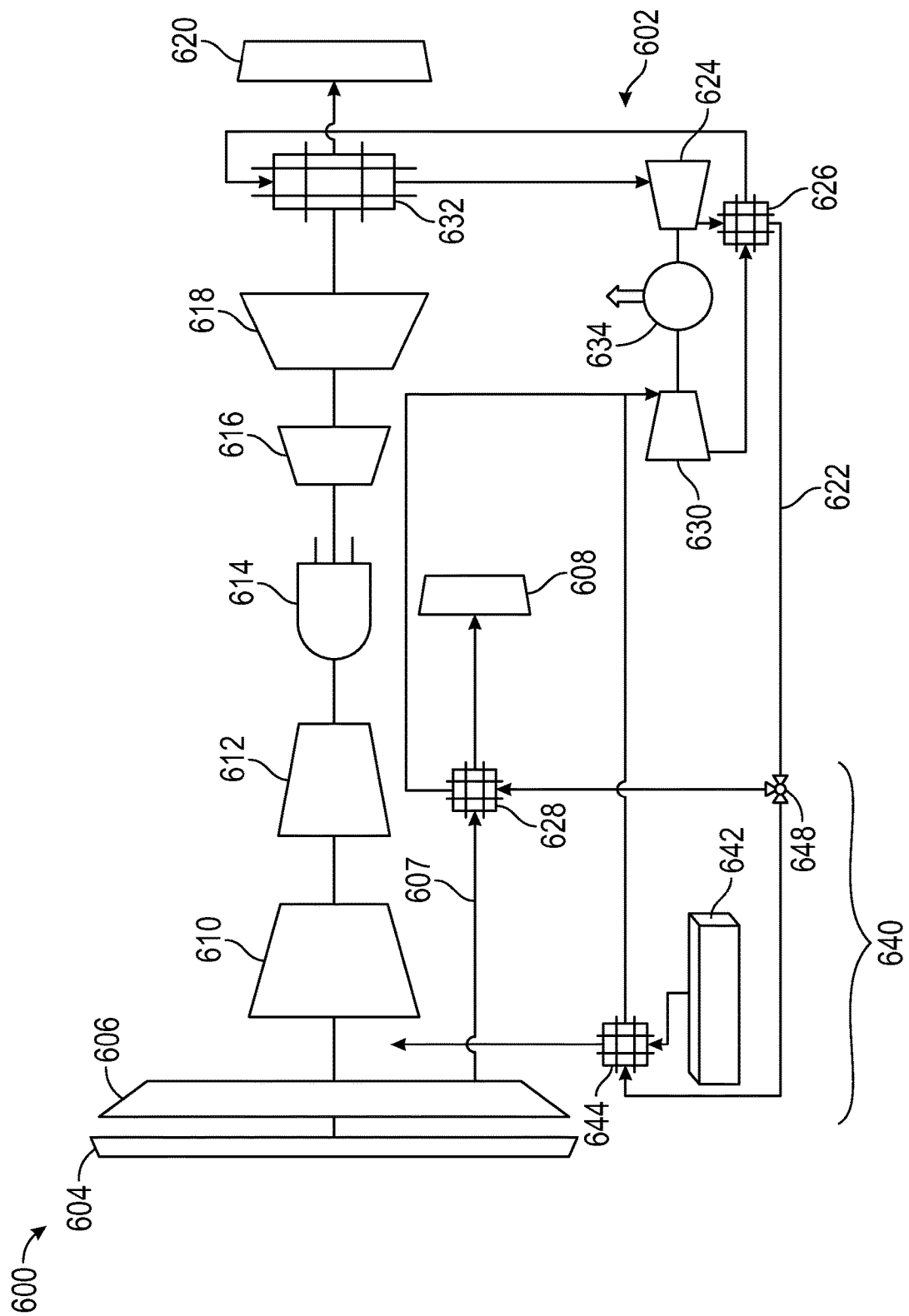
FIG. 6 is a schematic diagram of a gas turbine engine in accordance with an embodiment of the present disclosure.

Turning now to FIG. 6, a schematic diagram of a gas turbine engine 600 in accordance with an embodiment of the present disclosure is shown. The gas turbine engine 600 may be similar to that shown and described above, and may include a waste heat recovery system 602. The gas turbine engine 600 includes an inlet 604, a fan 606 with a fan nozzle 608, a low pressure compressor 610, a high pressure compressor 612, a combustor 614, a high pressure turbine 616, a low pressure turbine 618, and a core nozzle 620. A bypass flow path may be defined within a bypass duct defined within a nacelle, as described above.

In this configuration, the waste heat recovery system 602 includes a working fluid flow path 622 that may be a closed-loop system of $CO_2$ that is cycled to extract additional work from waste heat of the gas turbine engine 600, such as described above. The waste heat recovery system 602 includes (in a flow path/cycle direction along the flow path 622) a turbine 624, a recuperating heat exchanger 626, a heat rejection heat exchanger 628, a compressor 630, and a heat recovery heat exchanger 632. The turbine 624 is coupled to a power output 634 (e.g., a drive shaft) that can output work. For example, the power output 634 may be connected to a generator (e.g., to generate electricity) or mechanically connected to a fan to drive rotation of the fan (e.g., mechanical work).

In the waste heat recovery system 602 of FIG. 6, the heat or thermal energy of the working fluid may be transferred into a fan duct or ram air (e.g., a cooling duct 607) via the heat rejection heat exchanger 628 to return the working fluid to the starting point temperature. The cooling duct 607 is an airflow path through the gas turbine engine that is separate from a core flow path, and in some embodiments may be completely separate.

Similar to the embodiment of FIG. 5, the waste heat recovery system 602 includes an auxiliary cooling system 640 that is operably connected to the waste heat recovery system 602. The auxiliary cooling system 640 includes an auxiliary cooling source 642 and an auxiliary cooling heat exchanger 644. The auxiliary cooling heat exchanger 644 is arranged along a branch of the flow path 622 to enable the working fluid within the flow path 622 to thermally interact with a fluid sourced from the auxiliary cooling source 642. In this embodiment, the auxiliary cooling heat exchanger 644 is arranged downstream of the recuperating heat exchanger 626 and upstream of the heat rejection heat exchanger 628 along the flow path 622.

As shown in FIG. 6, the auxiliary cooling system 640 includes a control valve 648. The control valve 648 provides for a split within the flow path 622 to allow for selective control of a flow path of the working fluid within the waste heat recovery system 602. The control valve 648 may be configured to direct all or some of the working fluid to the auxiliary cooling heat exchanger 644 prior to being directed to the compressor 630 of the waste heat recovery system 602. As such, the working fluid may be cooled to a desired temperature for efficient operation of the waste heat recovery system 602. For example, the control valve 648 may be operated to direct some or all of the working fluid to the auxiliary cooling heat exchanger 644 when an aircraft is on the ground and/or during takeoff.

As shown in this configuration, the control valve 648 may be operated to selectively control the amount of working fluid passing through the heat rejection heat exchanger 628 and the auxiliary cooling heat exchanger 644. In some embodiments, the control valve 648 may be controlled such that the working fluid is directed completely through the auxiliary cooling heat exchanger 644 at warm temperature conditions (e.g., on the ground, during takeoff, etc.) and may be switched to direct the working fluid completely through the heat rejection heat exchanger 628 when the aircraft is in cold temperature conditions (e.g., at cruise altitudes). In some embodiments, a gradient of transition may be used such that the control valve 648 directs a portion of working fluid to the heat rejection heat exchanger 628 and another portion to the auxiliary cooling heat exchanger 644, which are merged together upstream of or at the compressor 630.

Figure 7:
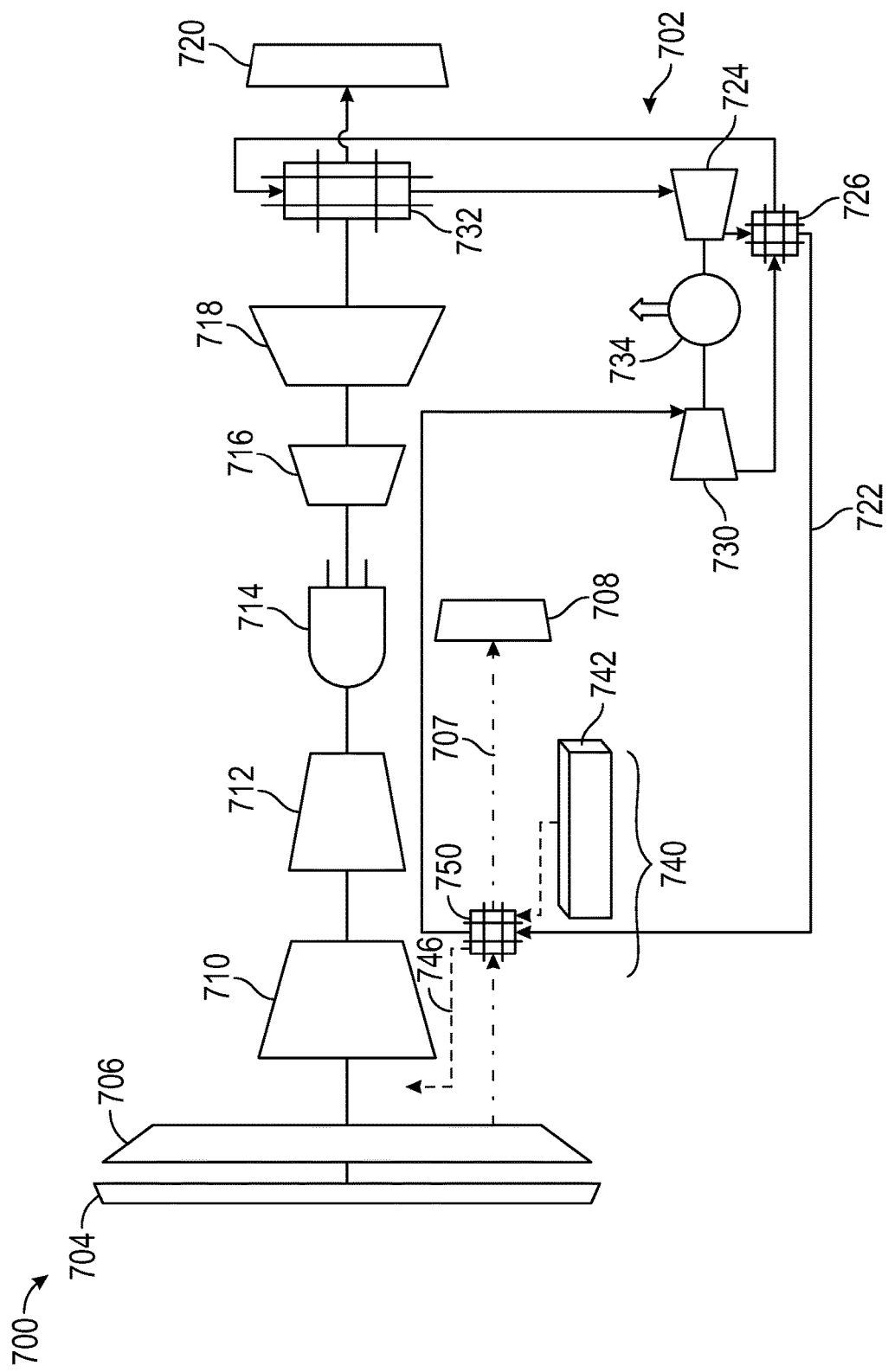
FIG. 7 is a schematic diagram of a gas turbine engine in accordance with an embodiment of the present disclosure.

Turning now to FIG. 7, a schematic diagram of a gas turbine engine 700 in accordance with an embodiment of the present disclosure is shown. The gas turbine engine 700 may be similar to that shown and described above, and may include a waste heat recovery system 702. The gas turbine engine 700 includes an inlet 704, a fan 706 with a fan nozzle 708, a low pressure compressor 710, a high pressure compressor 712, a combustor 714, a high pressure turbine 716, a low pressure turbine 718, and a core nozzle 720. A bypass flow path may be defined within a bypass duct defined within a nacelle, as described above.

In this configuration, the waste heat recovery system 702 includes a working fluid flow path 722 that may be a closed-loop system of $CO_2$ that is cycled to extract additional work from waste heat of the gas turbine engine 700, such as described above. The waste heat recovery system 702 includes (in a flow path/cycle direction along the flow path 722) a turbine 724, a recuperating heat exchanger 726, a heat rejection heat exchanger 750, a compressor 730, and a heat recovery heat exchanger 732. The turbine 724 is coupled to a power output 734 (e.g., a drive shaft) that can output work. For example, the power output 734 may be connected to a generator (e.g., to generate electricity) or mechanically connected to a fan to drive rotation of the fan (e.g., mechanical work).

In the waste heat recovery system 702 of FIG. 7, the heat or thermal energy of the working fluid may be transferred into a fan duct or ram air (e.g., a cooling duct 707) via the heat rejection heat exchanger 750 to return the working fluid to the starting point temperature. The cooling duct 707 is an airflow path through the gas turbine engine that is separate from a core flow path, and in some embodiments may be completely separate.

Similar to the embodiments of FIGS. 5-6, the waste heat recovery system 702 includes an auxiliary cooling system 740 that is operably connected to the waste heat recovery system 702. The auxiliary cooling system 740 includes an auxiliary cooling source 742. In contrast to the above described embodiments and configurations, an auxiliary cooling source flow path 746 of the auxiliary cooling system 740 flows through the heat rejection heat exchanger 750. In this illustrative embodiment, the heat rejection heat exchanger 750 is a multiple-fluid/multi-path (e.g., multistream) heat exchanger. Stated another way, the auxiliary heat exchanger of the other embodiments is integrally formed within the heat rejection heat exchanger 750 of the waste heat recovery system 702. A such, a first fluid stream through the heat rejection heat exchanger 750 may be the working fluid of the waste heat recovery system 702 (e.g., $sCO_2$), a second fluid stream may be a cooling stream through the cooling duct 707 (e.g., air), and a third fluid stream may be an auxiliary cooling fluid from the auxiliary cooling source 742 (e.g., cold water). The auxiliary cooling fluid may be supplied during warm temperature conditions (e.g., ground, takeoff, etc.).

Figure 8:
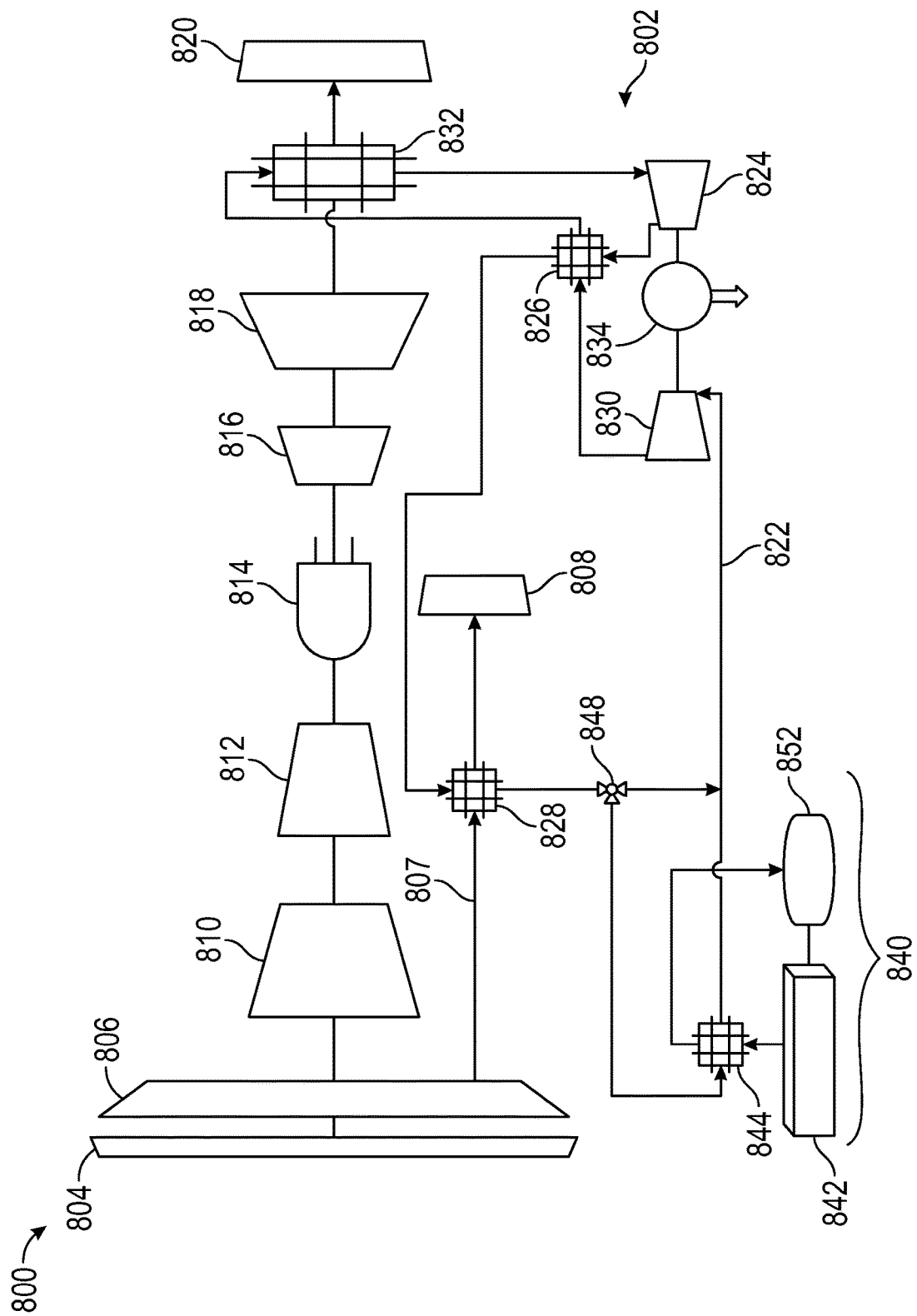
FIG. 8 is a schematic diagram of a gas turbine engine in accordance with an embodiment of the present disclosure.

Turning now to FIG. 8, a schematic diagram of a gas turbine engine 800 in accordance with an embodiment of the present disclosure is shown. The gas turbine engine 800 may be similar to that shown and described above, and may include a waste heat recovery system 802. The gas turbine engine 800 includes an inlet 804, a fan 806 with a fan nozzle 808, a low pressure compressor 810, a high pressure compressor 812, a combustor 814, a high pressure turbine 816, a low pressure turbine 818, and a core nozzle 820. A bypass flow path may be defined within a bypass duct defined within a nacelle, as described above.

In this configuration, the waste heat recovery system 802 includes a working fluid flow path 822 that may be a closed-loop system of $CO_2$ that is cycled to extract additional work from waste heat of the gas turbine engine 800, such as described above. The waste heat recovery system 802 includes (in a flow path/cycle direction along the flow path 822) a turbine 824, a recuperating heat exchanger 826, a heat rejection heat exchanger 828, a compressor 830, and a heat recovery heat exchanger 832. The turbine 824 is coupled to a power output 834 (e.g., a drive shaft) that can output work. For example, the power output 834 may be connected to a generator (e.g., to generate electricity) or mechanically connected to a fan to drive rotation of the fan (e.g., mechanical work).

In the waste heat recovery system 802 of FIG. 8, the heat or thermal energy of the working fluid may be transferred into a fan duct or ram air (e.g., a cooling duct 807) via the heat rejection heat exchanger 828 to return the working fluid to the starting point temperature. The cooling duct 807 is an airflow path through the gas turbine engine that is separate from a core flow path, and in some embodiments may be completely separate.

Similar to the above embodiments, the waste heat recovery system 802 includes an auxiliary cooling system 840 that is operably connected to the waste heat recovery system 802. The auxiliary cooling system 840 includes an auxiliary cooling source 842 and an auxiliary cooling heat exchanger 844. The auxiliary cooling heat exchanger 844 is arranged along a branch of the flow path 822 to enable the working fluid within the flow path 822 to thermally interact with a fluid sourced from the auxiliary cooling source 842. In this embodiment, the auxiliary cooling heat exchanger 844 is arranged downstream of the heat rejection heat exchanger 828 and upstream of the compressor 830 along the flow path 822, similar to that shown in FIG. 5.

As shown in FIG. 8, the auxiliary cooling system 840 includes a control valve 848. The control valve 848 provides for a split within the flow path 822 to allow for selective control of a flow path of the working fluid within the waste heat recovery system 802. The control valve 848 may be configured to direct all or some of the working fluid to the auxiliary cooling heat exchanger 844 prior to being directed to the compressor 830 of the waste heat recovery system 802. As such, the working fluid may be cooled to a desired temperature for efficient operation of the waste heat recovery system 802. For example, the control valve 848 may be operated to direct some or all of the working fluid to the auxiliary cooling heat exchanger 844 when an aircraft is on the ground and/or during takeoff.

As shown in this configuration, the auxiliary cooling system 840 includes an auxiliary cooling fluid storage 852, and thus the auxiliary cooling system 840 may be a substantially closed-loop system. In this configuration, the auxiliary cooling fluid storage 852 may be arranged in or on an aircraft to expose the auxiliary cooling fluid storage 852 to cool or cold temperatures to reduce a temperature of the auxiliary cooling fluid. For example, if the auxiliary cooling fluid is water, the auxiliary cooling fluid storage 852 may be arranged to enable chilling or freezing of the water when the aircraft is at cruise altitudes. Subsequently, when the aircraft is descending into warmer conditions and on the ground, the ice or chilled water may be used to cool the working fluid of the waste heat recovery system 802, and thus enable warm condition operation thereof.

In the configurations of FIGS. 5-8, the auxiliary cooling source may be a source or supply of ice or cold water. That is, a tank having ice or chilled water may be used to provide the auxiliary cooling fluid. In some embodiments, a block of ice can be deposited into a hopper or other container when an aircraft is on the ground, and thus the waste heat recovery system may be used efficiently when an aircraft is on the ground. The water, as noted above, can be recycled, recovered, or injected into a gaspath stream. However, the present disclosure and embodiments thereof are not limited to water-based solutions. For example, any cold fluid source can be employed without departing from the scope of the present disclosure.

In one alternative example, engines that are configured as cryogenic fuel turbines with a secondary Brayton cycle for waste heat recovery, there may be safety concerns with using fuel as the coolant in the heat exchanger that is in the main engine exhaust. Additionally, in concepts with supercritical $CO_2$ bottoming cycles, the pressure difference between the two fluids in the $CO_2$ cooler heat exchanger can lead to design challenges for size and weight.

Figure 9:
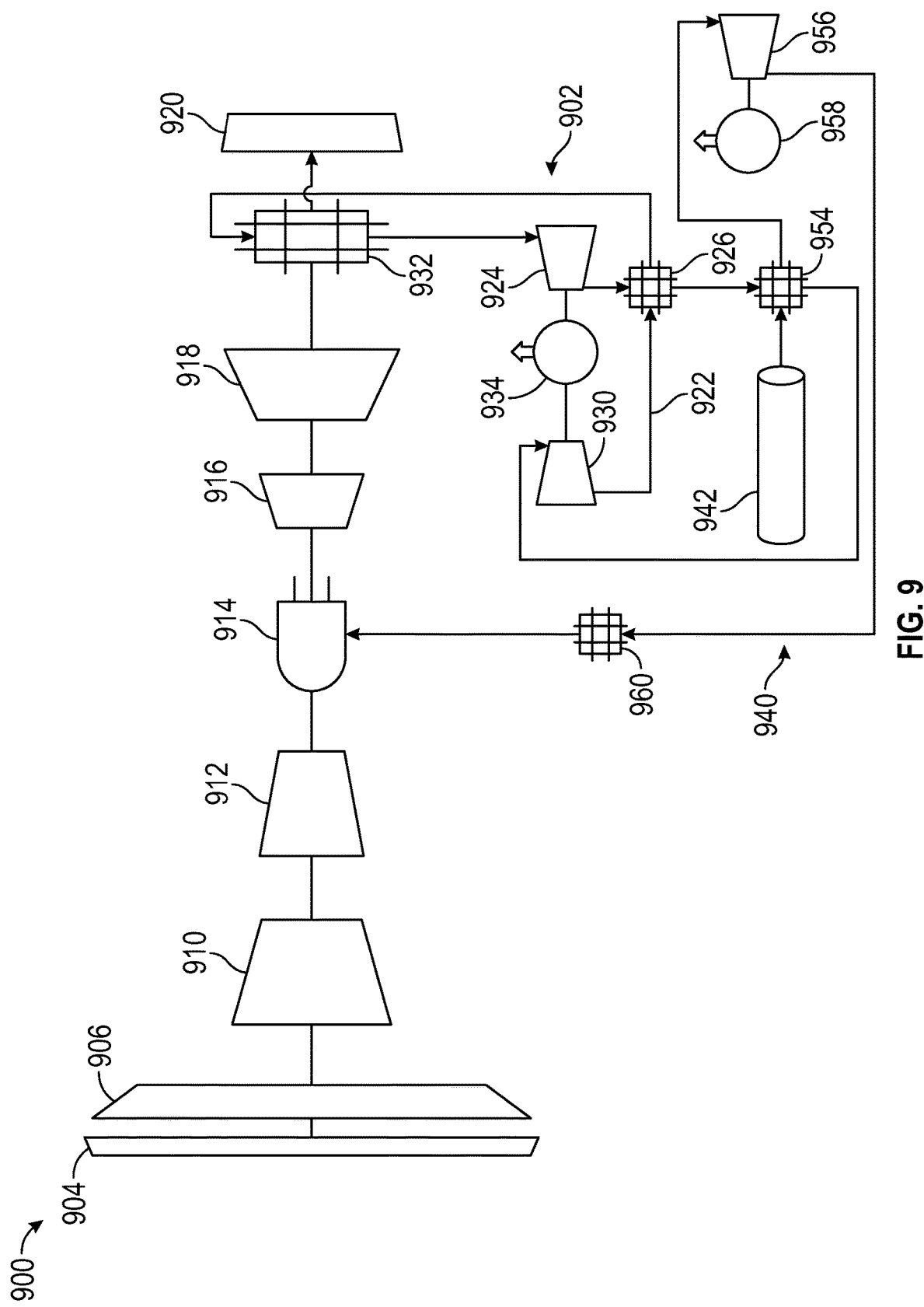
FIG. 9 is a schematic diagram of a gas turbine engine in accordance with an embodiment of the present disclosure.

Turning now to FIG. 9, a schematic diagram of a gas turbine engine 900 in accordance with an embodiment of the present disclosure is shown. The gas turbine engine 900 may be similar to that shown and described above, and may include a waste heat recovery system 902. The gas turbine engine 900 includes an inlet 904, a fan 906, a low pressure compressor 910, a high pressure compressor 912, a combustor 914, a high pressure turbine 916, a low pressure turbine 918, and a core nozzle 920. Other aspects of the gas turbine engine 900 and systems thereof are omitted for clarity.

In this configuration, the waste heat recovery system 902 includes a working fluid flow path 922 that may be a closed-loop system of $CO_2$ that is cycled to extract additional work from waste heat of the gas turbine engine 900, such as described above. The waste heat recovery system 902 includes (in a flow path/cycle direction along the flow path 922) a turbine 924, a recuperating heat exchanger 926, a heat rejection heat exchanger 954, a compressor 930, and a heat recovery heat exchanger 932. The turbine 924 is coupled to a power output 934 (e.g., a drive shaft) that can output work. For example, the power output 934 may be connected to a generator (e.g., to generate electricity) or mechanically connected to a fan to drive rotation of the fan (e.g., mechanical work).

In the waste heat recovery system 902 of FIG. 9, the heat or thermal energy of the working fluid may be transferred into an auxiliary cooling fluid via the heat rejection heat exchanger 954 to return the working fluid to the starting point temperature. Similar to the embodiments of FIGS. 5-8, the waste heat recovery system 902 includes an auxiliary cooling system 940 that is operably connected to the waste heat recovery system 902 by the heat rejection heat exchanger 954.

As shown, the auxiliary cooling system 940 includes an auxiliary cooling source 942. In contrast to the above described embodiments and configurations, the auxiliary cooling source 942 is a cold fuel tank (e.g., a cryogenic fuel tank). The auxiliary cooling source 942, in this embodiment, does not contain water, but rather contains a cold fluid, such as liquid and/or compressed hydrogen, supercritical hydrogen, methane, etc. and may be stored at cryogenic temperatures. The cryogenic fuel can operate as a cold sink to cool the working fluid of the waste heat recovery system 902.

As shown, the auxiliary cooling fluid passes from the auxiliary cooling source 942, through the heat rejection heat exchanger 954 of the waste heat recovery system 902, and into an expansion turbine 956. The expansion turbine 956 may optionally be connected to a power output 958 (e.g., a drive shaft) that can output work. For example, the power output 958 may be connected to a generator (e.g., to generate electricity) or mechanically connected to a fan to drive rotation of the fan (e.g., mechanical work). The warmed and expanded auxiliary cooling fluid (e.g., fuel) may then be directed into the combustor 914 of the gas turbine engine 900 for combustion thereof. As shown, an optional supplemental heat exchanger 960 may be arranged upstream of the combustor 914. The supplemental heat exchanger 960 can be arranged to provide additional cooling for fluids of the engine or aircraft (e.g., engine oil cooling, environmental control system cooling, cooled cooling air, etc. as will be appreciated by those of skill in the art). In some non-limiting configurations, a power electronics cooler heat exchanger may be arranged upstream of the heat rejection heat exchanger 954. Further, in some embodiments, a pump may be arranged to pump the fuel to acceptable conditions to fuel the combustor 914.

It is noted that in the embodiment of FIG. 9, the heat rejection heat exchanger 954 is the only heat rejection heat exchanger arranged along the working fluid flow path 922. However, in other embodiments, the illustrated heat rejection heat exchanger 954 may be configured similar to the heat rejection heat exchangers described and shown above, and the output from the auxiliary cooling source 942 may be passed through an auxiliary cooling heat exchanger and a control valve may be optionally included to direct the working fluids through various flow paths, as described above.

The configuration illustrated in FIG. 9 combines the utilization of supercritical $CO_2$ as a working fluid of a waste heat recovery subsystem with a gas turbine powered by a cryogenic fuel. The combined system consists of a cryogenic fuel that is (optionally) first used to cool onboard power electronics (e.g., between the auxiliary cooling source 942 and the heat rejection heat exchanger 954), and then heated further by the main engine exhaust heat via a secondary fluid, namely the working fluid of the waste heat recovery system 902 (e.g., supercritical $CO_2$, in a $CO_2$/Fuel heat exchanger—heat rejection heat exchanger 954). The fuel is then expanded through a turbine to generate power from heat moved from the exhaust. The cryogenic fuel can then still be used to cool the engine oil, aircraft ECS, and/or turbine cooling air, before being injected to the main engine burner. The working fluid of the waste heat recovery system 902 heated by the exhaust stream will also extract power via the turbine 924 of the waste heat recovery system 902 before the excess heat is removed via the heat rejection heat exchanger 954 and used to heat the cryogenic fuel for further power extraction. Once the working fluid of the waste heat recovery system 902 is cooled, the working fluid will enter the compressor 930 of the waste heat recovery system 902 as part of a closed loop cycle.

Advantageously, embodiments of the present disclosure provide for an additional cold source during hot day take-off conditions for waste heat recovery systems. Such additional cooling can aid in efficiencies of the waste heat recovery systems. In accordance with some embodiments, a stored ice/chilled water supply is provided to allow for additional cooling of a working fluid with a waste heat recovery system. In some embodiments, advantageously, the water can be injected into the core stream and thus increase a main engine core massflow during take-off. Such increased massflow can allow for optimizing an engine design for cruise fuel burn and thereby reduce weight of the engine and associated systems. In some embodiments, advantageously, the water may be captured and stored at altitude and may be available for in-flight use, or may be stored to re-freeze and be reused. As such, in accordance with some embodiments, the system may not need to be recharged with ice/chilled water prior to a subsequent flight.

Further, advantageously, in accordance with some embodiments, the waste heat recovery system may be combined with a cryogenic fuel system. In such embodiments, the combined system may eliminate various safety risks associated with using fuel as a working fluid in a heat exchanger that is in the high temperature, high pressure environment of a gas turbine engine exhaust. Further, advantageously, embodiments described herein can allow the heat rejection heat exchanger of a waste heat recovery system to be reduced in weight and volume. Additionally, such systems may allow for the efficiency benefit of using a supercritical working fluid (e.g., $sCO_2$) in the waste heat recovery heat exchanger, due to the supercritical, high heat capacity properties nearly matching engine exhaust conditions. Furthermore, advantageously, the combined system can allow for a smaller main engine core, higher overall thermal efficiency, smaller cryogenic fuel tanks, and lower total fuel burn.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed:
1. A gas turbine engine of an aircraft comprising:
  a compressor section;
  a combustor section;
  a turbine section; and
  a nozzle, wherein the compressor section, the combustor section, the turbine section, and the nozzle define a core flow path that expels through the nozzle;
  a waste heat recovery system operably connected to the gas turbine engine, the waste heat recovery system having a working fluid; and
  an auxiliary cooling system configured to provide cooling to the working fluid of the waste heat recovery system,
  a control valve configured to be selectively operated when a temperature of the working fluid of the waste heat recovery system is 70° F. or greater and direct the working fluid into the auxiliary cooling system to provide the cooling to the working fluid.

2. The gas turbine engine of claim 1, wherein the auxiliary cooling system is configured to cool the working fluid of the waste heat recovery system using at least one of ice and chilled water.

3. The gas turbine engine of claim 1, wherein the auxiliary cooling system is configured to cool the working fluid of the waste heat recovery system using a cryogenic fuel.

4. The gas turbine engine of claim 1, wherein the auxiliary cooling system comprises an auxiliary cooling source and an auxiliary cooling heat exchanger.

5. The gas turbine engine of claim 1, wherein the waste heat recovery system comprises a turbine, a recuperating heat exchanger, a heat rejection heat exchanger, a compressor, and a heat recovery heat exchanger.

6. The gas turbine engine of claim 5, wherein the turbine of the waste heat recovery system is configured to generate work.

7. The gas turbine engine of claim 5, wherein the heat recovery heat exchanger is arranged in an exhaust of the nozzle.

8. The gas turbine engine of claim 1, wherein the waste heat recovery system further comprises a blower operably connected to a cooling duct and configured to create a pressure drop across a heat rejection heat exchanger of the waste heat recovery system.

9. The gas turbine engine of claim 1, wherein the working fluid of the waste heat recovery system is supercritical $CO_2$ ($sCO_2$).

10. The gas turbine engine of claim 1, wherein at least one of:
  (i) the auxiliary cooling system is configured to be selectively used when a temperature of the working fluid of the waste heat recovery system is 70° F. or greater at a pressure of about 853 psi,
  (ii) the auxiliary cooling system is configured to be selectively used when a temperature of the working fluid of the waste heat recovery system is 88° F. or greater at a pressure of about 1,070 psi,
  (iii) the auxiliary cooling system is configured to be selectively used when a temperature of the working fluid of the waste heat recovery system is 20° F. or greater at a pressure of about 422 psi, or
  (iii) the auxiliary cooling system is configured to be selectively used when a temperature of the working fluid of the waste heat recovery system is −58° F. or greater at a pressure of about 100 psi.

11. A gas turbine engine of an aircraft comprising:
a compressor section;
a combustor section;
a turbine section; and
a nozzle, wherein the compressor section, the combustor section, the turbine section, and the nozzle define a core flow path that expels through the nozzle;
a waste heat recovery system operably connected to the gas turbine engine, the waste heat recovery system having a working fluid; and
an auxiliary cooling system configured to provide cooling to the working fluid of the waste heat recovery system, the auxiliary cooling system comprising:
a cryogenic fuel tank;
an expansion turbine;
an auxiliary cooling heat exchanger; and
a control valve configured to selectively direct the working fluid of the waste heat recovery system to the auxiliary cooling heat exchanger to provide the cooling to the working fluid.

12. The gas turbine engine of claim 11, wherein the at least one additional heat exchanger is configured to enable thermal exchange between a cryogenic fuel and at least one of (i) onboard power electronics, (ii) air of an environmental control system, (iii) engine oil, and (iv) cooled cooling air of the gas turbine engine.

13. A gas turbine engine comprising:
a compressor section;
a combustor section;
a turbine section; and
a nozzle, wherein the compressor section, the combustor section, the turbine section, and the nozzle define a core flow path that expels through the nozzle;
a waste heat recovery system operably connected to the gas turbine engine, the waste heat recovery system having a working fluid;
an auxiliary cooling system configured to provide cooling to the working fluid of the waste heat recovery system, wherein the waste heat recovery system comprises a turbine, a recuperating heat exchanger, a heat rejection heat exchanger, a compressor, and
a heat recovery heat exchanger, and the heat recovery heat exchanger is arranged in an exhaust of the nozzle.

14. A gas turbine engine of an aircraft comprising:
a compressor section;
a combustor section;
a turbine section; and
a nozzle, wherein the compressor section, the combustor section, the turbine section, and the nozzle define a core flow path that expels through the nozzle;
a waste heat recovery system operably connected to the gas turbine engine, the waste heat recovery system having a working fluid; and
an auxiliary cooling system configured to provide cooling to the working fluid of the waste heat recovery system,
wherein the auxiliary cooling system comprises an auxiliary cooling source and an auxiliary cooling heat exchanger, and
wherein the auxiliary cooling system comprises a control valve configured to selectively direct at least a portion of the working fluid of the waste heat recovery system to the auxiliary cooling heat exchanger.

15. A gas turbine engine comprising:
a compressor section;
a combustor section;
a turbine section; and
a nozzle, wherein the compressor section, the combustor section, the turbine section, and the nozzle define a core flow path that expels through the nozzle;
a waste heat recovery system operably connected to the gas turbine engine, the waste heat recovery system having a working fluid; and
an auxiliary cooling system configured to provide cooling to the working fluid of the waste heat recovery system,
wherein the waste heat recovery system comprises a turbine, a recuperating heat exchanger, a heat rejection heat exchanger, a compressor, and a heat recovery heat exchanger,
wherein the auxiliary cooling system comprises an auxiliary cooling heat exchanger arranged between the heat rejection heat exchanger and the compressor.

16. A gas turbine engine comprising:
a compressor section;
a combustor section;
a turbine section; and a nozzle, wherein the compressor section, the combustor section, the turbine section, and the nozzle define a core flow path that expels through the nozzle;
a waste heat recovery system operably connected to the gas turbine engine, the waste heat recovery system having a working fluid; and
an auxiliary cooling system configured to provide cooling to the working fluid of the waste heat recovery system,
wherein the waste heat recovery system comprises a turbine, a recuperating heat exchanger, a heat rejection heat exchanger, a compressor, and a heat recovery heat exchanger,
wherein the auxiliary cooling system comprises an auxiliary cooling heat exchanger arranged between the recuperating heat exchanger and the heat rejection heat exchanger.

17. A gas turbine engine comprising:
a compressor section;
a combustor section;
a turbine section; and
a nozzle, wherein the compressor section, the combustor section, the turbine section, and the nozzle define a core flow path that expels through the nozzle;
a waste heat recovery system operably connected to the gas turbine engine, the waste heat recovery system having a working fluid; and
an auxiliary cooling system configured to provide cooling to the working fluid of the waste heat recovery system,
wherein the waste heat recovery system comprises a turbine, a recuperating heat exchanger, a heat rejection heat exchanger, a compressor, and a heat recovery heat exchanger,
wherein the heat rejection heat exchanger is a three-fluid heat exchanger configured to receive the working fluid of the waste heat recovery system, a cooling fluid of the auxiliary cooling system, and an air cooling flow.

18. A gas turbine engine of an aircraft comprising:
a compressor section;
a combustor section;
a turbine section; and
a nozzle, wherein the compressor section, the combustor section, the turbine section, and the nozzle define a core flow path that expels through the nozzle;
a waste heat recovery system operably connected to the gas turbine engine, the waste heat recovery system having a working fluid; and
an auxiliary cooling system configured to provide cooling to the working fluid of the waste heat recovery system,
wherein the waste heat recovery system further comprises a blower operably connected to a cooling duct and configured to create a pressure drop across a heat rejection heat exchanger of the waste heat recovery system; and
a control valve configured to selectively direct the working fluid of the waste heat recovery system to the auxiliary cooling system to provide the cooling to the working fluid.

19. A gas turbine engine of an aircraft comprising:
a compressor section;
a combustor section;
a turbine section; and
a nozzle, wherein the compressor section, the combustor section, the turbine section, and the nozzle define a core flow path that expels through the nozzle;
a waste heat recovery system operably connected to the gas turbine engine, the waste heat recovery system having a working fluid;
an auxiliary cooling system configured to provide cooling to the working fluid of the waste heat recovery system; and
a control valve configured to selectively direct the working fluid of the waste heat recovery system to the auxiliary cooling system to provide the cooling to the working fluid,
wherein at least one of:
(i) the auxiliary cooling system is configured to be selectively used when a temperature of the working fluid of the waste heat recovery system is 70° F. or greater at a pressure of about 853 psi,
(ii) the auxiliary cooling system is configured to be selectively used when a temperature of the working fluid of the waste heat recovery system is 88° F. or greater at a pressure of about 1,070 psi,
(iii) the auxiliary cooling system is configured to be selectively used when a temperature of the working fluid of the waste heat recovery system is 20° F. or greater at a pressure of about 422 psi, or
(iv) the auxiliary cooling system is configured to be selectively used when a temperature of the working fluid of the waste heat recovery system is −58° F. or greater at a pressure of about 100 psi.

* * * * *